United States Patent [19]
Roddy et al.

[11] Patent Number: 5,162,929
[45] Date of Patent: Nov. 10, 1992

[54] SINGLE-BEAM, MULTICOLOR HOLOGON SCANNER

[75] Inventors: James E. Roddy; Badhri Narayan, both of Rochester; Robert H. Cuffney, Honeoye Falls; Kevin J. Klees, Rochester; Laurie L. Voci, Farmington, all of N.Y.

[73] Assignee: Eastman Kodak Company, Rochester, N.Y.

[21] Appl. No.: 726,413

[22] Filed: Jul. 5, 1991

[51] Int. Cl.$^5$ ............................................. G02B 26/10
[52] U.S. Cl. ........................................ 359/17; 359/18; 359/22; 359/204; 359/569; 359/574
[58] Field of Search .................... 359/17, 18, 22, 204, 359/572, 574, 569

[56] References Cited
U.S. PATENT DOCUMENTS

| 3,619,033 | 11/1971 | McMahon | 359/19 |
| 3,721,487 | 3/1973 | Pieuchard et al. | 359/17 |
| 3,795,768 | 3/1974 | Locke | 359/19 |
| 3,917,378 | 11/1975 | Gale | 359/24 |
| 4,289,371 | 9/1981 | Kramer | 359/569 |
| 4,528,448 | 7/1985 | Doggett | 359/18 |
| 4,591,242 | 5/1986 | Broockman et al. | 359/17 |
| 4,737,448 | 4/1988 | Hochberg | 359/572 |
| 4,761,046 | 8/1988 | Funato | 359/18 |
| 4,848,863 | 7/1989 | Kramer | 359/18 |

OTHER PUBLICATIONS

"Light Beam Deflection Using Holographic Scanning Techniques", by D. H. McMahon et al., Feb. 1969, vol. 8, No. 2, Applied Optics.
Optical Information Processing and Holography, by W. Thomas Cathey, 1974, pp. 289-293, 310-311, John Wiley & Sons.
Handbook of Optical Holography, by H. J. Caulfield, 1979, pp. 191-204, 207-208, Academic Press, Inc.

Primary Examiner—Carolyn E. Fields
Attorney, Agent, or Firm—Mark Z. Dudley

[57] ABSTRACT

A three-color laser scanner using a holographically-generated plane linear grating disk (hologon). The disk includes peripherally-arranged facets having identical multiplexed diffraction gratings. Each multiplexed grating is formed from plural superimposed interference patterns accumulated by multiple exposures to light from a single monochromatic laser beam source. The multiplexed grating is optimized to diffract certain light wavelengths in a single, multichromatic (plural wavelength) input laser beam. The diffracted output beam comprises respective wavelength beam components that simultaneously scan in collinear fashion. Modulation of the plural wavelength components in the incident beam allows the output beam to scan expose a multicolor image at the image plane.

30 Claims, 4 Drawing Sheets

SINGLE-BEAM, MULTICOLOR HOLOGON SCANNER

FIELD OF THE INVENTION

This invention relates generally to holographic beam scanning apparatus, and more specifically to scanning apparatus providing a single multichromatic scanning beam.

BACKGROUND OF THE INVENTION

Laser sources, combined with rotating beam deflection mechanisms, are known for use in reading image information (also known as input scanning), exposing or printing image information (also known as output scanning), and display of image information. Prevalent use is made of holographic beam deflectors, which intercept a stationary beam of light, such as from a laser source, and which are rotated to cause the beam to scan.

Holographic beam deflectors typically comprise a carrier substrate in the form of a hologon disk that is mountable for rotation about an axis at the center of the disk. The disk may be transparent or opaque depending on whether the holographic beam deflector is of the transmission or reflection type. The disk may be regarded as divided into a plurality of sector-shaped facets, that is, regions bounded by two radial lines extending radially from the axis of the disk and an arc concentric with the disk, the arc usually being a portion of the circular periphery of the disk. The angles, included by the radial lines bounding each of the facets, are typically the same and sum to 360°. Each facet includes a surface relief diffraction grating pattern usually formed in a photoresist layer carried by the carrier substrate disk, or a volumetric diffraction grating pattern in suitable material on or within the substrate. The lines of the diffraction grating pattern of each facet may be "radial", that is, parallel to the radius which bisects the facet, or they may be "tangential", that is, perpendicular to the radius bisecting the facet.

In a conventional multi-facet holographic beam deflector, a single diffraction grating pattern in each facet is provided to diffract a monochromatic (single wave length) light beam. For example, Kramer, in U.S. Pat. No. 4,289,371 discloses a plane linear grating disk for use as the beam deflection element in a holographic scanning apparatus. The scanning beam produced by such an apparatus is made wobble-insensitive if the incident and diffracted angles of the monochromatic beam illuminating the holographic disk are kept essentially equal. By use of linear, non-focusing gratings, such a hologon is also insensitive to errors in the centration of the disk on its rotational axis. The disclosed apparatus provides high resolution output with negligible banding without resort to non-spherical corrective optics.

A hologon-based beam scanner that is capable of providing a scanning beam having plural wavelength components, whereby the beam components would scan an image plane in a simultaneous and collinear fashion, would be quite advantageous for exposure of a multichromatic light sensitive medium, such as color photographic film. However, the conventional hologon-based scanner, such as the aforementioned proposed hologon scanner by Kramer, is unsuitable for the production of a multichromatic scanning beam because the conventional diffraction grating is dispersive. That is, the grating tends to split a multichromatic input beam into separately diverging component wavelength beams that do not scan in a collinear fashion.

The foregoing condition is based upon the known predisposition of a multichromatic beam, when diffracted by a linear plane diffraction grating having parallel grating lines, to separate into constituent monochromatic beams which exit the grating at different angles, as shown by the grating equation:

$$\sin \theta_i + \sin \theta_d = \lambda/d$$

where $\theta_i$ and $\theta_d$ are incidence and diffraction angles, respectively, of the input beam;

$\lambda$ is the wavelength of the input beam; and d is the grating pitch

For example, if $\theta_i$ is fixed at 45°, and $\lambda$ varies from red, to green, to blue, the angle $\theta_d$ will change radically. In a typical hologon scanner, a 3-color input beam would be diffracted into three scanning beams which expose three non-coincident scan lines.

Furthermore each scan line will have differing length and will exhibit a non-linearity (bow) which, when accumulated in the plural scan lines that fill an 8½" page, would be equivalent to hundreds of pixels. Even if plural, single-wavelength beams (instead of a multichromatic input beam) were incident on the hologon disk at three different input angles so as to produce a composite, collinear output beam, the well-known desired minimum wobble condition could be satisfied for only one wavelength component in the composite output beam. Also, the scan line length and scan line bow would be different for each wavelength component in the output beam. The resulting scan line(s) would be unsatisfactory for most applications. These deleterious effects are known in the art and can be calculated using known beam trajectory equations; for example, as disclosed by R. A. Stark in U.S. Pat. No. 4,707,055.

The use of a single hologon for diffracting incident beams of differing wavelengths into at least three output beams has been proposed by Locke, in U.S. Pat. No. 3,795,768. Unfortunately, the resulting beam spots are not superimposed and the disclosed hologon is comprised of a thin reflective relief hologram, which cannot be made wobble insensitive.

One alternative approach has been proposed by McMahon et al., in U.S. Pat. No. 3,619,033 and in "Light Beam Deflection Using Holographic Scanning Techniques", in the February 1969, Vol. 8, No. 2, issue of APPLIED OPTICS. Disclosed is an apparatus for recording a three-color display, wherein the apparatus uses three separate color channel holograms (holographically-formed diffraction gratings) located at different radial positions on a photographic plate. Hence, the respective holograms are radially-separated and do not overlap. The apparatus is said to provide three output beams that are focussed to the same spatial position.

However, the fabrication of the proposed holograms in the apparatus disclosed by McMahon et al. will require an exposure system using illumination beams of three different colors. Also, the respective gratings must be separately located on the photographic plate or other substrate. A plural-wavelength exposure beam scheme is more difficult to accomplish than if a single wavelength exposure beam were used. Further, the plural-wavelength exposure beam scheme severely limits the materials that may be used in generating surface relief diffraction gratings, because the exposure material of choice (photoresist) is generally sensitive only to blue or ultraviolet light.

The separately-located gratings may occupy so much area that the resulting hologon disk or plate is undesireably large. The speed of rotation of the disk, and thus its scanning rate, is therefore limited because the aerodynamic drag and the centrifugal stress on the disk increase greatly as the hologon diameter is increased. A small hologon is preferable, as the drag on a disk when spun is proportional to approximately the fifth power of the disk diameter, and the stress induced in the disk due to centrifugal force is proportional to the second power of the disk diameter. The cost of diffraction grating fabrication also decreases as the disk diameter decreases.

The prior approaches to a multichromatic beam deflection apparatus, including those described by McMahon and Locke, also have a tendency to produce scan lines that are arcuate, which is undesireable in some applications. Further, the prior approaches typically incorporate either a lenticular (focusing) grating or a lenswheel—devices which are known to be sensitive to centration error and to wobble.

Kramer, in U.S. Pat. No. 4,848,863, discloses a hologon scanning apparatus which uses sequentially-arranged single wavelength gratings formed in respective facets in a disk, or in separate plates. Each grating is optimized to one wavelength of light in a multi-wavelength (red, blue, green) incident beam. Each facet or element has a different grating period, and all have the same λ over D (wavelength to grating period) ratio. The facets or elements are moved serially to successively intercept the composite, multi-wavelength beam. The beam spots from each wavelength in the respective output beams are said to overlap and scan essentially collinear lines, successively, on the image surface.

However, because only a single wavelength scan line is provided from each facet or element, at least three facets or elements, for example, must be rotated through the incident beam to provide three respective collinear scan lines. The available scan rate of the proposed apparatus is therefore less than desired. Further, because the disclosed gratings are separately spaced (so as to be sequentially illuminated), the hologon disclosed by Kramer is necessarily larger and more cumbersome than is desired.

SUMMARY OF THE INVENTION

The present invention provides a single output beam, multicolor scanning system using a rotating hologon while avoiding the problems associated with the previously-described systems. One object of the invention is to provide an essentially straight scan line exposure by a multichromatic scanning output beam from a small diameter hologon that is effectively insensitive to wobble and centration errors. Another object is to use simple, low cost scanner optics by designing the hologon to be operable from a single collimated multichromatic input light beam. Another object is to fabricate the hologon using exposure methods, materials, and optics that require an exposure beam of only one wavelength, such that the exposure system may be greatly simplified and the wavelength of the exposure beam may be optimized to match the sensitivity of the material used to form the diffraction grating.

Accordingly, the present invention contemplates a three-color laser scanner using a holographically-generated plane linear grating disk (hologon) composed of peripherally-arranged facets having identical multiplexed gratings. Each multiplexed grating is formed from plural superimposed interference patterns accumulated by multiple exposures to light from a single monochromatic laser beam source. The multiplexed grating is optimized to diffract certain light wavelengths in a single, multichromatic (plural wavelength) input laser beam. The diffracted output beam comprises respective wavelength beam components that simultaneously scan in collinear fashion. Simultaneous modulation of the plural wavelength components in the incident beam allows the output beam to scan expose a multicolor image at the image plane. The output beam may be used to scan multichromatic (e.g. red, green, and blue) image information at a scan rate significantly higher than that offered by conventional hologon laser scanners that use a hologon with sequentially-arranged, single-wavelength gratings. Synchronization requirements are simplified for the rotation of the contemplated hologon disk because only one facet (rather than three or four) is required to diffract all of the desired spectral components in the input beam.

An advantage of the contemplated hologon is that the individual multiplexed gratings can be formed by exposure to a monochromatic laser beam. Preferably, surface relief linear gratings are formed, which allows the use of photoresist. Also, because the preferred gratings are of the linear, non-lenticular (non-focusing) type, the gratings may be illuminated by an input beam having wavelength components that are different than the exposure beam, without incurring optical aberrations. Because the input beam is incident at one point on the hologon disk, and need not be radially separated on the disk, the diameter of the preferred hologon disk is minimized.

BRIEF DESCRIPTION OF THE DRAWINGS

An embodiment of the present invention will now be described, by way of example, with reference to the accompanying drawings of which FIGS. 1 and 3 illustrate Prior Art, and in which:

FIG. 1 diagrammatically represents one of several ways of creating an interference pattern, suitable for use in manufacturing a hologon disk for a holographic scanner;

FIG. 3 diagrammatically represents a known mask for use in fabricating the hologon disk represented in FIG. 2;

DETAILED DESCRIPTION OF THE INVENTION

Figure 1:
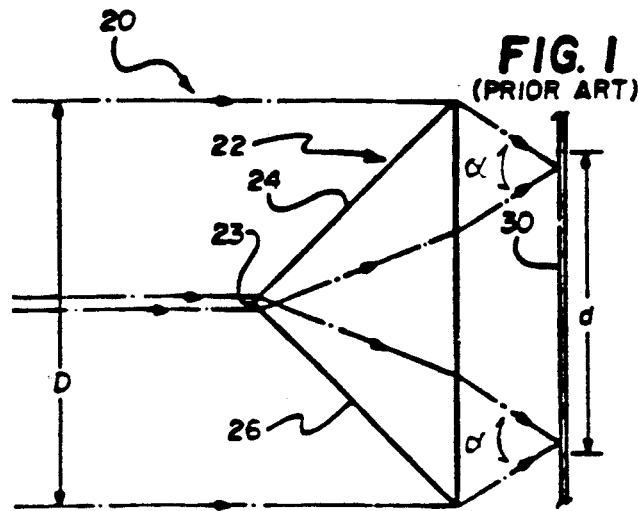

Several methods for making conventional diffraction gratings are known; see, for example, Hutley, M. C., *Diffraction Gratings*, Academic Press (1982), at p. 101. One of the ways for producing diffraction gratings disclosed by Hutley is illustrated in FIG. 1 of the accompanying drawings. It will be observed that a beam 20 of coherent radiation from a laser may be directed at a prism 22. The portion of the beam 20 incident on a first facet 24 of the prism 22 is refracted downwards and the portion of the beam incident on the second facet 26 is refracted upwards. The two portions of the beam interfere in the air space, contiguous with the base 28 of the prism, after they emerge from the base 28, and create a straight line interference pattern in that air space. Designated by 30 is a plane, parallel with the base 28 of the prism 22, in which lies the interference pattern having the greatest area.

Figure 2:
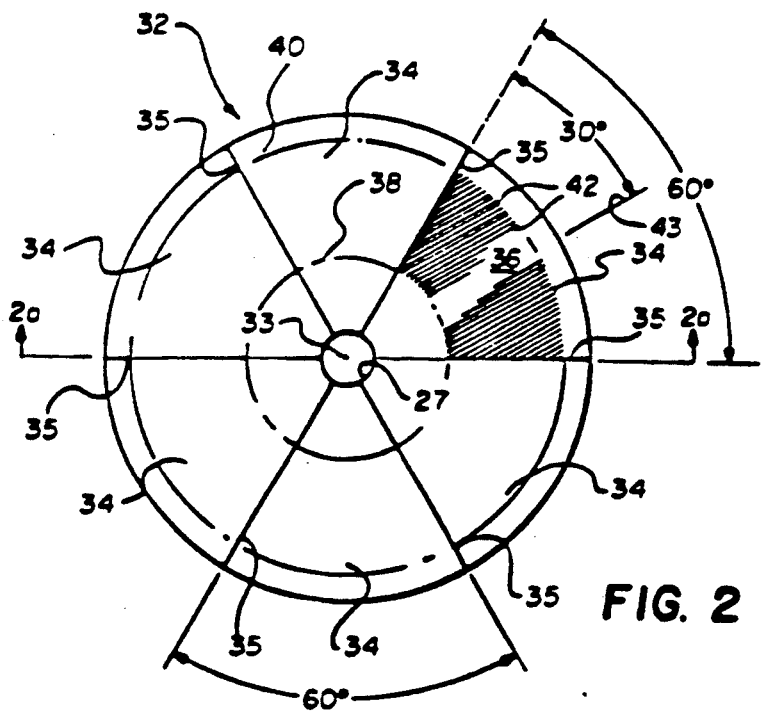
FIG. 2 diagrammatically represents a preferred embodiment of a hologon disk having multiplexed diffraction gratings fabricated according to a modified version of the technique illustrated in FIG. 1.
Figure 2A:
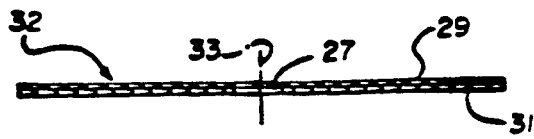
FIG. 2a is a cross-sectional view taken on the line 2a-2a in FIG. 2.

FIGS. 2 and 2a illustrate a novel hologon constructed according to the present invention such that a multiplexed diffraction grating is provided in each facet. The hologon 32 comprises a substrate carrier disk 31 of rigid material having thereon a coating 29 of photoresist material. The disk 31 has a central aperture 27, for cooperation with a mounting and drive shaft (not shown) on an axis 33. The hologon has six facets 34, bounded by radial lines 35. Each facet 34 includes a multiplexed diffraction grating pattern 36 bounded by arcs of inner and outer circles 38 and 40, respectively, which are concentric with the hologon 32. The diffraction lines 42 in the multiplexed diffraction grating are simplified in FIG. 2, on a greatly enlarged scale, and are shown in one facet only. It will be observed that the lines 42 are parallel to the radius 43 which bisects the facet of which they are part. Thus, the illustrated hologon is a "radial hologon". Further information on multiply exposed and multiplexed holograms may be found in *Optical Information Processing and Holography*, by W. Thomas Cathey, JOHN WILEY & SONS; and *Handbook of Optical Holography*, by H. J. Caulfield, ACADEMIC PRESS, INC.

Figure 3:
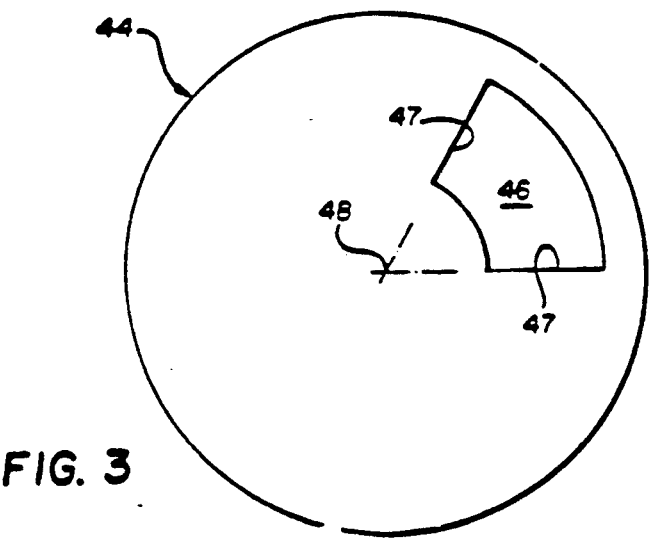

FIG. 3 illustrates a known mask 44 for defining the extent of the multiplexed diffraction grating to be created in each facet 34 of the hologon disk 32. The mask has an aperture 46 and a center point 48 which is the point of intersection of the lines of the two sides 47 of the aperture. Other mask configurations are known in the art to provide another shape, such as that disclosed by Debesis commonly-assigned U.S. Pat. No. 4,840,443, issued Jun. 20, 1989, the disclosure of which is included herein by reference.

In the preferred embodiment of the present invention, each multiplexed diffraction grating is formed by plural exposures of light-sensitive material in or on each of the plural facets of a hologon disk substrate. In a modification of the procedure already outlined with respect to FIG. 1, the plural exposures are preferably accomplished by a monochromatic laser beam such that the grating pitch (d) in each interference pattern is related to the angle ($\alpha$) of the interfering beams and the selected exposure wavelength ($\lambda$) by the relation:

$$\sin(\alpha/2) = \lambda/d$$

By varying the angle $\alpha$ between the two beams, the grating pitch (d) can be adjusted to optimize the resulting interference pattern for a selected wavelength $\lambda_1$, $\lambda_2$, $\lambda_3$, or ... $\lambda_n$ in a multichromatic reconstruction light beam.

Accordingly, each multiplexed diffraction grating comprises an optical summation of n component interference patterns. To fabricate each multiplexed diffraction grating, a succession of interference pattern exposures is effected according to the number (n) and wavelengths ($\lambda_1$, $\lambda_2$, $\lambda_3$, ... $\lambda_n$) that will later be encountered in the reconstruction beam (which will be termed hereinafter the input beam, for simplicity). As will be described in detail below, after the exposures are complete, the photosensitive material is processed to provide a permanent pattern of variation in the index of refractivity of the material.

The preferred photosensitive material is selectable from those that form a permanent variation in their index of refractivity in response to light exposure. Suitable materials are well known in the art and include dichromated gelatin (to form a volume hologram) or, preferably, a layer of photoresist (to form a surface relief hologram).

Each interference pattern exposure is effected with a change in the beam angle $\alpha$; this may be accomplished as known in the art by use of, for example, successive prisms 22 each of which have a different angle between the two facets 24,26. Each prism 22 is precisely located with respect to the substrate, which is located at the plane 30 at an angle and position that is fixed and registered to reference pins or surfaces. The respective exposure is made, and the prism 22 is removed and replaced with the succeeding prism until all the requisite exposures are made. The entire exposure sequence can be done with one optical system and the optics need not be color corrected or recollimated for each wavelength. Furthermore, all of the exposures can be accomplished with a monochromatic exposure beam.

To make the preferred surface relief hologon, the mask 44 is placed in relation to a substrate carrier disk coated with photoresist with the center 48 of the mask 44 coincident with the axis 33 of the disk. A first prism 22, designed for a first exposure angle $\alpha$, is so disposed that the disk takes the place of the plane 30 illustrated in FIG. 1, and the resulting first interference pattern fills the aperture 46. That is, the edge 23 of the prism is disposed so that it is parallel to the radius 43 bisecting the facet. The prism and the dimension D of the light beam 20 are both large enough that the entire aperture 46 is illuminated. The first interference pattern is thereby exposed on the entire area of the photoresist uncovered by the aperture in the mask 44. After exposure, the disk is rotated through exactly 60° and another first interference pattern exposure is made. This step and expose process is repeated until all six facets have been exposed with the first interference pattern. The complete multiplexed diffraction grating is provided by repeating the foregoing step-and-expose process (which involved a first prism 22 having angle $\alpha_1$ for wavelength $\lambda_1$) with prisms providing angles $\alpha_2$, $\alpha_3$ ... $\alpha_N$ tailored to respective wavelengths $\lambda_2$, $\lambda_3$, ... $\lambda_N$.

The accumulated exposures are then developed to yield a set of multiplexed diffraction gratings each being identically optimized for collinear diffraction of the desired light wavelengths. In the preferred embodiment, development is effected by etching the photoresist, followed by a cleaning step, to thus yield a completed hologon.

One example of the preferred exposure and develop process may be implemented as follows. A disk substrate would be selected from known optical glass stock, such as a yellow optical glass blank commercially available from Schott Glass Technologies, Duryea, Pa., and known as SCHOTT OG-550. Then, the preferred steps may include:

a. apply positive photoresist, such as Hunt 204 photoresist commercially available from Olin-Hunt Specialty Products, West Paterson, N.J.;
b. spin coat photoresist to a 1.2 micron thickness;
c. soft bake workpiece at 70° C. for 1 hour;
d. expose each facet at a one third of nominal exposure level (at approximately one-third of a 160 mJ nominal level, exposure is approximately 53 milliJoules) with argon laser (458 nm line) using S-polarized light to achieve a multiplexed diffraction grating responsive to red, green, and blue spectral components in an input beam, (although an incremental exposure technique is recommended to optimize the exposure levels for a given combination of materials and processing equipment);
e. develop in Hunt LSI-Type 2 developer, commercially available from Olin-Hunt Specialty Products, at a diluted strength of 1:3;
f. rinse in deionized water;
g. blow dry with dry nitrogen; and
h. clean reverse side with acetone to remove any resist.

Figure 4:
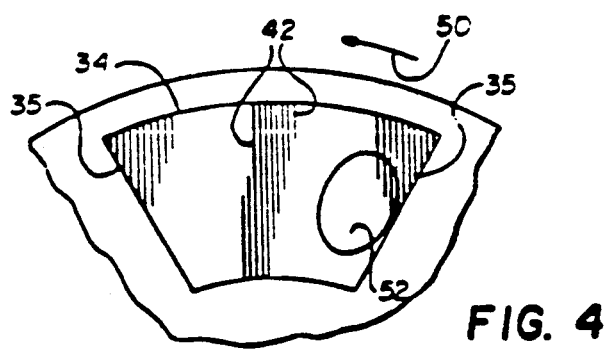
FIG. 4 is an illustration of a facet of the hologon disk of FIG. 2.
Figure 5:
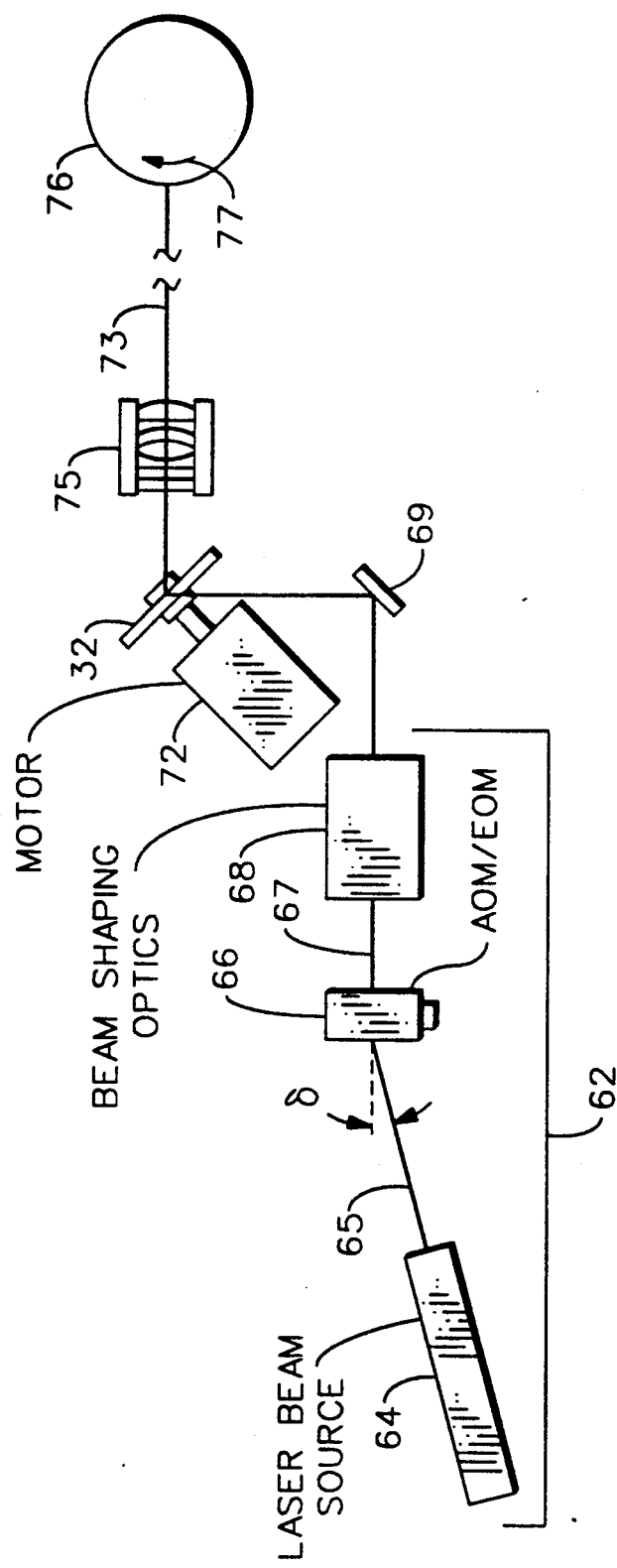
FIG. 5 illustrates a single beam multicolor holographic scanner constructed in accordance with the present invention, in which the hologon disk of FIG. 2 may be advantageously used.

Referring now to FIGS. 4 and 5, there is illustrated a single-beam, multicolor laser scanner in which the above-described hologon may be usefully applied. FIG. 4 represents one facet 34 of the hologon disk 32 which, for the purpose of the description, will be regarded as rotating counterclockwise, as indicated by the arrow 50. Also shown in FIG. 4 is the spot 52 created by a collimated input beam of multichromatic color-modulated laser light that is to be converted from a stationary input beam into a scanning output beam by the rotating hologon. The input beam has an angle of incidence $\theta_i$ equal to the angle of diffraction $\theta_d$. In the preferred embodiment, the angle of incidence and the angle of diffraction are equal. Preferably, these angles are 45°.

As shown in FIG. 5, a multichromatic, modulated beam source 62 includes a laser beam source 64 generating a multichromatic ($\lambda_1, \lambda_2, \lambda_3 \ldots \lambda_n$) source beam 65 that enters an acousto-optical (AO) modulator 66. The component wavelengths $\lambda_1, \lambda_2, \lambda_3 \ldots \lambda_n$ are diffracted and intensity-modulated by respective acoustic wavelengths $\Lambda_1, \Lambda_2, \Lambda_3 \ldots \Lambda_n$ generated by RF electrical carrier frequencies $f_1, f_2, f_3 \ldots f_n$. The carrier frequencies are selected such that for all component wavelengths the following ratio is maintained constant:

$$\sin \delta = \frac{\lambda_n}{2\Lambda_n}$$

Preferably, n=3 and the component wavelengths $\lambda$ correspond to red, green, and blue light beams that emerge collinearly as a white light input beam 67. Beam shaping optics 68 and a mirror 69 form the beam 67 to the proper size and direct it to the rotating hologon 32 whereupon the input beam 67 becomes a scanning output beam 73.

The contemplated output beam 73 will scan in a nominally horizontal direction as the hologon 32 is rotationally driven by a high speed motor 72. The output beam 73 then passes through beam focusing optics, such as a reflective optical element or an f-$\theta$ lens 75 to form a single beam spot on a target represented by rotating drum 76. The image plane is therefore located at the drum surface where the scan is parallel to the axis of drum rotation.

The output beam 73 is deflected in a horizontal scanning (x-axis) direction on the image surface of drum 76, along a line normal to the plane of the drawing in FIG. 5, while the vertical or cross scan component of the beam in the z-axis direction is achieved by rotation of the drum 76 in the direction of arrow 77 to thus generate a two-dimensional raster scan.

The f-$\theta$ lens 75 is an achromat, optimized for the output beam wavelengths $\lambda_1, \lambda_2, \lambda_3 \ldots \lambda_n$, and it also contains a field flattener to provide good focus on a flat surface.

The f-$\theta$ lens also compensates for distortion so that beam motion at the image surface is directly proportional to hologon rotation rate throughout the entire scan. Preferably, the hologon scanner is an output device such as a printer, and therefore the target would include a photosensitive medium on the drum surface. Alternatively, the contemplated hologon scanner can be modified, according to techniques known to a skilled practitioner, to be operable as an input device, such as an optical reader.

The illustrated beam source 64 is preferably a laser beam source providing at its output a single multichromatic beam. A "white light" laser source that generates a single laser beam having red, green, and blue spectral components that are emitted in simultaneous, collinear, and coincident fashion is commercially available in the form of a mixed-gas laser from Liconix, Santa Clara, Calif.; Lexel Laser, Fremont, Calif., or Laser Ionics, Orlando, Fla. Known white light lasers produce red (647 nm), green (514 nm), and blue (458 nm) spectral components by using, typically, a mixture of argon gas and krypton gas. The blue and green components are emitted during argon quantum energy state transitions and the red line is emitted from a krypton quantum energy state transition. Also, a helium-cadmium laser will produce all three spectral components.

The acousto-optic (AO) modulator 66 is known in the art as a device having single or plural piezoelectric transducers with each transducer being optimized for a radio-frequency (RF) carrier frequency. Application of an RF carrier to the piezoelectric transducer creates an acoustic wave in the device which diffracts the applied laser beam approximately perpendicular to the acoustic wave propagation. Optimum diffraction efficiency occurs at the Bragg angle $\delta$ given by:

$$\sin \delta = \frac{\lambda}{2\Lambda}$$

where $\lambda$ is the optical wavelength of the laser beam, $\Lambda$ is the acoustic wavelength of the AO modulator, and light enters the modulator at an angle $\delta$ to the normal to the modulator surface. The undiffracted beam passes unchanged through the modulator and emerges at an angle $\delta$ with respect to the normal to the entering beam. This beam is unused and is blocked by a beam stop (not shown). The diffracted beam emerges from the modulator at an angle $\delta$ with respect to the normal but on the opposite side from the undiffracted beam such that the angle between the diffracted and undiffracted beams is 2(δ).

For a laser beam having components of different wavelengths, the output beams will not emerge at the same angle, or at the optimum Bragg angle, unless the λ/2Λ ratio is identical for each color. Hence, if n acoustic wavelengths $\Lambda_1, \Lambda_2, \Lambda_3, \ldots \Lambda_n$ are generated with respect to the n component wavelengths $\lambda_1, \lambda_2, \lambda_3 \ldots \lambda_n$, such that the λ/2Λ ratio is a constant for each of the three desired wavelengths, then the desired beam components will emerge as a collinear white light beam.

Preferably, n=3 and the beam components are at the preferred red, green, and blue wavelengths. Other colors in the source beam, that are not matched to the acoustic wavelengths that excite the AO modulator, are diffracted at reduced intensity in directions other than the optic axis of the output beam 67 and are blocked by means (not shown). As a result, the three desired wavelengths are independently intensity modulated by modulating the power in each RF carrier frequency in a manner known in the art.

Further details concerning the aforementioned AO modulator 66 and suitable component beam modulation techniques may be found in commonly-assigned U.S. Pat. Re. 29,670 reissued in the name of Spaulding and commonly-assigned U.S. Pat. Re. 31,334, reissued in the names of Spaulding and Pickering, the disclosures of which are included herein by reference. Further details on AO modulators and suitably alternative electro-optical (EO) modulators may be found in modern optics texts, such as Hunsperger, R. G., *Integrated Optics: Theory and Technology*, Springer-Verlag (1982) and Yariv, A., *Introduction to Optical Electronics*, Holt, Rinehart (1976). Commercial embodiments of suitable AO modulators operable from plural RF carrier inputs are available from Crystal Technologies, Palo Alto, Calif.

The input beam 65 is directed to the hologon disk such that the incidence angle $\theta_i$ is equal to the diffraction angle $\theta_d$, approximately 45°. Each of the desired spectral components is therefore diffracted from the hologon 32 to exactly the same angle as the other desired spectral components. The laser source 64 may in practice have other (undesired) spectral emissions, but they are diffracted out of the optical path by the hologon gratings, where they are spatially filtered by means (not shown) known in the art. Also, each spectral component is diffracted to some extent by the fringe patterns in the multiplexed diffraction grating that are intended for the other spectral components. For example, the green spectral component is not only diffracted by the hologon disk 32 to the proper diffraction angle $\theta_d$, but it is also diffracted such that resulting off-axis beams of lower intensity are diffracted off of the optic axis. However, if for example the green beam is diffracted at 45° by the grating, the unwanted off-axis beams will be diffracted by at least an additional 15° from the desired optic axis and, therefore, can be spatially filtered by means such as a beam stop (not shown) near the drum 76. Diffraction efficiency also rolls off parabolically with wavelength and with incidence angle; therefore, the strength of the off-axis beam is considerably less than the on-axis beam.

Figure 6:
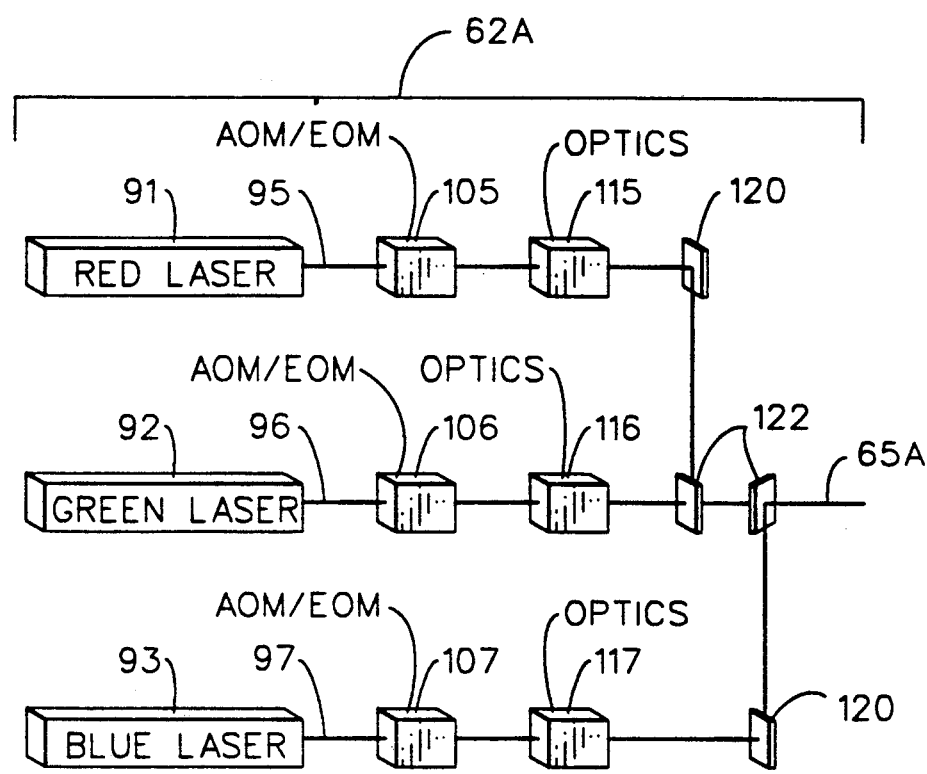
FIG. 6 illustrates an alternative embodiment of a laser beam source for use in the holographic beam scanner of FIG. 5.

An alternative embodiment of the multichromatic, modulated beam source 62 of FIG. 5 is shown in FIG. 6. The contemplated beam source assembly 62A includes plural, separate laser light sources providing monochromatic laser beams having wavelengths $\lambda_1, \lambda_2, \lambda_3 \ldots \lambda_N$, respectively. In the illustrated three-laser system, the preferred laser light sources are a helium-neon (HeNe) laser 91, operating at a $\lambda_1 = 633$ nanometers (nm); an argon (Ar) laser 92, operating at $\lambda_2 = 514$ nm; and a helium-cadmium laser light sources 91, 92, 93 provide respective monochromatic laser beams 95, 96, 97.

Following each laser light source 91, 92, 93 is a respective light modulator 105, 106, 107 to vary the received beam intensity in accordance with, for example, red, green, and blue image information supplied to the modulators by suitable electronic means (not shown) as known in the art. At any given time the light modulators 105, 106, 107 control which color is being written. For instance, the red, green, and blue beams 95, 96, 97 would form a "white" signal if all the light modulators were suitably modulated "on" to appropriate levels. Single frequency acousto-optical (AO) and electro-optical (EO) modulators are available from many sources; for example, commercial embodiments are offered by Cambridge Research and Instrumentation Cambridge, Mass.; Conopties, Inc., Danbury, Conn.; or Crystal Technology, Inc., Palo Alto, Calif.

Timing for the light modulator signals is derived from the start-of-scan (SOS) and disk rotation detectors (not shown) to synchronize the beam modulation with the disk rotation. Respective beam-forming optics 115, 116, 117 may include a beam expander which shapes the beam such that the single focused beam spot will appear at the image plane with the desired size and shape. Such beam-forming optics are known in the art. The three output beams are then combined into a composite multichromatic laser beam 65A by means of known mirrors 120 and dichroic mirrors 122.

A single, color-modulated, scanning output beam 73 thus is generated for reading or writing image information in multiple colors. It may therefore be appreciated that the contemplated hologon beam scanner is less prone to an undesireable effect experienced in prior-art multibeam systems: misregistration. In a conventional multiple-beam laser scanning system, the individual beams follow different optical paths for all or part of the system; because it is possible for the optical systems to "creep" (shift) out of optical alignment, the colors in the image writing or image reading process will become misregistered. In contrast, the spectral components of the laser beams 65, 67, and 73 in the preferred hologon scanner illustrated in FIG. 5 are coincident through the system. Any creep in the system optical components may cause a minor shift in image location, but will not cause misregistration.

Furthermore, because the output beam 73 is not dispersed, the contemplated apparatus will expose successive scan lines that will have the same scan length and residual bow. The essentially bow-free scan is accomplished as disclosed by Kramer in U.S. Pat. No. 4,289,371, or by Stark, in U.S. Pat. No. 4,707,055, or in patent application Ser. No. 848,426, filed in the names of Narayan, Roddy, Stark, and Thompson, entitled "Scanner Apparatus", (abandoned) the disclosures of which are incorporated herein by reference. Firstly, the multiplexed diffraction grating is linear and thus is effectively insensitive to tilt and centration error. Also, according to the invention, the incidence angle is equal to the diffracted angle such that the minimum wobble condition is satisfied for the plural spectral components in the beam, and the input beam is incident at the appropriate $\theta_i$ such that $\theta_d$ is identical for all the wavelengths of the input beam. Consequently, all the diffracted spectral components exit the grating as a single (coincident) output beam.

Lastly, and according to the invention, to preserve all the desirable qualities of a linear grating hologon, the grating pitch in the multiplexed diffraction grating is optimized to each of the several desired spectral components in the input beam. Because $\theta_i$ must equal $\theta_d$, then the grating equation becomes:

$$\sin \theta = \lambda/2d \qquad (10)$$

and in order to maintain $\theta_i$ and $\theta_d$ both equal ($\theta = 45°$) as $\lambda$ changes from red, to green, to blue, d must also change to keep the ratio $\lambda/d$ constant. Thus, for every hologon rotation angle $\phi$, the scanning beam will follow a fixed trajectory for any color as long as d is adjusted for each $\lambda$ to maintain G (i.e. $\lambda/d$) a constant value. Further details of the calculation of G may be found in Kramer, U.S. Pat. No. 4,289,371, the disclosure of which is incorporated herein by reference.

Table I lists nominal performance specifications that would be achievable by a continuous tone color printer incorporating a hologon scanner of the present invention, for production of an image on color film or color print paper as the hard copy output media.

TABLE I

| PERFORMANCE SPECIFICATIONS | | |
|---|---|---|
| Scan length | 8½" | |
| Page Length | 12" | |
| Resolution | 300 pixels/inch | |
| Bow | 0.5 pixel | |
| Laser Source: | 3 laser | "White Light" |
| Spectral components: | | |
| Red | 633 nm (HeNe) | 647 nm |
| Green | 514 nm (Ar) | 514 nm |
| Blue | 442 nm (HeCd) | 458 nm |
| Full Color Prints/Hour | 600 (nominal) | |
| Spot Size (FWHM) | .0333" | |
| Film Sensitivity | 10 ergs/cm² | |

Based on the grating design equations given above, Table II represents the calculated performance figures for a holographic laser scanner using the 3-color laser system of FIG. 6. The 3-color system was assumed to operate from a modulated, multichromatic output beam diffracted from the hologon illustrated in FIG. 2. The incidence angle was assumed to be marginally off 45° for optimum bow. The gratings were assumed to be plane linear transmissive type, and assumed to be designed for equal incident and diffraction angles and to be substantially insensitive to wobble and centration errors. The $\lambda/d$ ratio was assumed to be maintained for each color so that all three spectral components follow identical scan trajectories. A helium-neon (HeNe) laser was assumed to be employed to produce the red beam component, an argon (Ar) laser for the green beam component, and a helium-cadmium (He-Cd) laser for the blue beam component. The projected system is shown to be capable of providing a single, essentially bow-free, three-color scan line.

TABLE II

| SCANNER SYSTEM PARAMETERS | |
|---|---|
| Three Laser Beam Source (HeNe, Ar, HeCd) | |
| Disc Diameter | 2" |
| # of Facets | 9 |
| Motor RPM | 12,000 |
| Beam Diameter (1/e²) | |
| Red 632 nm | .101" |
| Green 514 nm | .082" |
| Blue 441 nm | .071" |
| f-theta lens focal length | 13.1" |
| f-theta F/stop | 115 |
| Scan Angle, degrees | ±18.6 |
| Duty Cycle (minimum for red) | 65% |
| Data Rate (Burst) | 7 MHz |
| Laser Power @ 50% efficiency (65% duty cycle) | 2 mW |
| Maximum Bow (pixels) | .5 |
| Beam incidence angle, degrees | 44.68 |
| Grating Frequency, c/mm | |
| Red | 2222 |
| Green | 2733 |
| Blue | 3185 |
| $\lambda/d$ Ratio | 1.406 |
| Full Color 8½" × 12" Prints/Hour | 600 |

The invention has been described in detail with particular reference to preferred embodiments thereof, but it will be understood that variations and modifications can be effected within the spirit and scope of the invention. The composite output beam components in the claimed hologon scanner may be used to generate color images by independently modulating the individual laser sources, as previously described. Or, after obvious modification of the preferred embodiment by one skilled in the art, the hologon scanner may be used to read color image information in a color image positioned at the image plane by measuring the spectrum of reflected light from the scanned image.

We claim:

1. Beam scanning apparatus, comprising:
   means for providing a multichromatic input beam having n desired spectral components at corresponding wavelengths $\lambda_1, \lambda_2 \ldots \lambda_n$;
   input beam deflection means including at least one multiplexed diffraction grating for receiving the input beam at an incident angle $\theta_i$ thereon and for providing an output beam at a diffraction angle $\theta_d$, the multiplexed diffraction grating being formed of n component interference patterns, each pattern having a pitch d selected according to the condition that the ratio $\lambda_n/d_n$ is a constant, so as to diffract the plural spectral components collinearly and simultaneously, the diffracted components constituting a single output beam; and
   means for providing relative movement between the input beam and the beam deflecting means whereby a scanning motion is imparted to the output beam.

2. The beam scanning apparatus of claim 1, further comprising means for maintaining the incident angle $\theta_i$ at a value substantially constant and equal to the diffraction angle $\theta_d$.

3. The beam scanning apparatus of claim 1, wherein the beam deflecting means further comprises a rotatable hologon disk, the disk having plural ones of the multiplexed diffraction grating located in respective facets.

4. The beam scanning apparatus of claim 1, wherein the means for providing relative movement further comprises means for locating and rotating the hologon disk with respect to the input beam such that the input beam is incident on successive multiplexed diffraction gratings.

5. The beam scanning apparatus of claim 4, wherein the multiplexed diffraction gratings are of the plane linear surface relief type.

6. The beam scanning apparatus of claim 4, wherein the multiplexed diffraction gratings are of the plane linear volumetric type.

7. The beam scanning apparatus of claim 1, wherein the input beam providing means is a white light laser.

8. The beam scanning apparatus of claim 1, wherein the input beam providing means further comprises:
   n monochromatic laser light sources providing respective individual light beams at the wavelengths $\lambda_1, \lambda_2 \ldots \lambda_n$; and
   optical means for combining the individual light beams into a collinear composite beam suitable for use as the multichromatic input beam.

9. The beam scanning apparatus of claim 1, further comprising means for modulating the intensity of the spectral components in the input beam in response to an applied image information signal.

10. The beam scanning apparatus of claim wherein n=3 and $\lambda_1$ corresponds to a red spectral component, $\lambda_2$ corresponds to a green spectral component, and $\lambda_3$ corresponds to a blue spectral component.

11. The beam scanning apparatus of claim 1, further comprising:
   optical means, operable on at least one of the input beam and output beam, to focus the scanning output beam to a single beam spot of predetermined shape and size at an image plane;
   means for providing relative movement between the scanning output beam and a photosensitive medium located at the image plane to provide an imagewise exposure of the medium according to the color information signal.

12. A single beam, multicolor laser scanner for recording color image information, comprising:
   laser beam source providing a multichromatic input beam having at least three desired spectral components at corresponding wavelengths $\lambda_1, \lambda_2,$ and $\lambda_3$;
   a rotatable hologon disk, the disk having plural multiplexed diffraction gratings in respective facets for receiving the input beam at an incident range $\theta_i$ thereon and for providing an output beam at a diffraction angle $\theta_d$, each multiplexed diffraction grating being formed of three component interference patterns, each pattern having a pitch d selected according to the condition that the ratio $\lambda/d$ is a constant, so as to diffract the plural spectral components collinearly and simultaneously, the diffracted components constituting a single output beam;
   means for modulating the intensity of the spectral components in the input beam in response to an applied signal representative of the color image information to be recorded;
   means for rotating the hologon disk with respect to the input beam such that the input beam is incident on successive multiplexed diffraction gratings whereby a scanning motion is imparted to the output beam;
   optical means, operable on at least one of the input beam and output beam, to focus the scanning output beam to a single beam spot of predetermined shape and size at an image plane; and
   means for providing relative movement between the scanning output beam and a photosensitive medium located at the image plane to provide an imagewise exposure of the medium according to the color information signal.

13. The laser scanner of claim 12, further comprising means for maintaining the incident angle $\theta_i$ at a value substantially constant and equal to the diffraction angle $\theta_d$.

14. The laser scanner of claim 12, wherein the multiplexed diffraction gratings are of the plane linear surface relief type.

15. The laser scanner of claim 12, wherein the multiplexed diffraction gratings are of the plane linear volumetric type.

16. The laser scanner of claim 12, wherein the laser beam source further comprises a white light laser.

17. The laser scanner of claim 12, wherein the laser beam source further comprises:
   three monochromatic laser light sources providing respective individual light beams at the wavelengths $\lambda_1, \lambda_2, \ldots \lambda_n$; and
   optical means for combining the individual light beams into a collinear composite beam suitable for use as the multichromatic input beam.

18. The laser scanner of claim 17, wherein $\lambda_1$ corresponds to a red spectral component, $\lambda_2$ corresponds to a green spectral component, and $\lambda_3$ corresponds to a blue spectral component.

19. Rotatable beam deflector for deflecting a multichromatic light beam having n desired spectral components at corresponding wavelengths $\lambda_1, \lambda_2, \ldots \lambda_n$, comprising:
   a substrate; and
   at least one multiplexed diffraction grating integral with the substrate, the grating being operable to receive the multichromatic input beam at an incident angle $\theta_i$ thereon and to diffract the plural spectral components collinearly and simultaneously, the diffracted components constituting a single output beam at a diffraction angle $\theta_d$, the multiplexed diffraction grating being formed of n component interference patterns, each pattern having a pitch d selected according to the condition that the ratio $\lambda_n/d_n$ is a constant.

20. The rotatable beam deflector of claim 19, wherein the substrate further comprises a rotatable disk, the disk having plural facets located about a central aperture, the aperture having an axis of rotation about which the disk may be rotated, and wherein each facet has integrally-formed therein a respective multiplexed diffraction grating such that the individual gratings may be rotated through the input beam.

21. The rotatable beam deflector of claim 20, wherein the multiplexed diffraction gratings are of the plane linear surface relief type.

22. The rotatable beam deflector of claim 20, wherein the multiplexed diffraction gratings are of the plane linear volumetric type.

23. The rotatable beam deflector of claim 20, wherein n=3 and $\lambda_1$ corresponds to a red spectral component, $\lambda_2$ corresponds to a green spectral component, and $\lambda_3$ corresponds to a blue spectral component.

24. Method of effecting multichromatic light beam scanning, comprising the steps of:
   providing a multichromatic input beam having n desired spectral components at corresponding wavelengths $\lambda_1, \lambda_2, \ldots \lambda_n$;
   directing the input beam to at least one multiplexed diffraction grating in a beam deflection means at an incident angle $\theta_i$ thereon, whereby the plural spectral components are diffracted collinearly and simultaneously, the diffracted components constituting a single output beam at a diffraction angle $\theta_d$, the multiplexed diffraction grating being formed of n component interference patterns, each pattern having a pitch d selected according to the condition that the ratio $\lambda_n/d_n$ is a constant; and providing relative movement between the input beam and the beam deflection means whereby a scanning motion is imparted to the output beam.

25. The beam scanning method of claim 24, further comprising the step of maintaining the incident angle $\theta_i$ at a value substantially constant and equal to the diffraction angle $\theta_d$.

26. The beam scanning method of claim 24, wherein the beam deflecting means further comprises a rotatable hologon disk, the disk having plural ones of the multiplexed diffraction grating located in respective facets, and wherein the step of providing relative movement further comprises the step of rotating the hologon disk with respect to the input beam such that the input beam is incident on successive multiplexed diffraction gratings.

27. The beam scanning method of claim 24, wherein the step of providing the input beam further comprising the step of modulating the intensity of the spectral components in the input beam in response to an applied image information signal.

28. The beam scanning method of claim 27, wherein the steps of providing and modulating an input beam further comprise:

providing n individual monochromatic laser light beams at wavelengths $\lambda_1, \lambda_2, \ldots \lambda_n$;

modulating the individual laser light beams according to respective image information data signals; and combining the modulated laser light beams into a collinear composite beam suitable for use as the multichromatic input beam.

29. The beam scanning method of claim 28, wherein n=3 and $\lambda_1$ corresponds to a red spectral component, $\lambda_2$ corresponds to a green spectral component, and $\lambda_3$ corresponds to a blue spectral component.

30. The beam scanning method of claim 24, further comprising the steps of:

focussing the scanning output beam to a single beam spot of predetermined shape and size at an image plane;

locating a photosensitive medium at the image plane; and providing relative movement between the scanning output beam and the photosensitive medium to provide an imagewise exposure of the medium according to the color information signal.

* * * * *

UNITED STATES PATENT AND TRADEMARK OFFICE
CERTIFICATE OF CORRECTION

PATENT NO. : 5,162,929
DATED : November 10, 1992
INVENTOR(S) : James Roddy et al It is certified that error appears in the above-indentified patent and that said Letters Patent is hereby corrected as shown below:

Claim 12

Column 13, line 44, delete "range" and substitute --angle--therefor.

Signed and Sealed this

Nineteenth Day of October, 1993

Attest:

BRUCE LEHMAN

Attesting Officer    Commissioner of Patents and Trademarks